United States Patent

Harding et al.

[15] 3,660,040
[45] May 2, 1972

[54] GASEOUS OXIDE RECOVERY

[72] Inventors: Charles I. Harding; Lamar V. Russell; W. Malcolm Steeves, all of P.O. Box 4850, Jacksonville, Fla. 32201; Irwin R. Higgins, P.O. Box 549, Oak Ridge, Tenn. 32210

[22] Filed: Apr. 10, 1969

[21] Appl. No.: 814,936

[52] U.S. Cl.................................23/260, 23/2 R, 23/178 R, 23/261
[51] Int. Cl.................C01b 17/60, B01d 53/14, B01d 53/34
[58] Field of Search........................23/260, 261, 178 R, 2 R

[56] References Cited

UNITED STATES PATENTS

| | | | |
|---|---|---|---|
| 1,260,493 | 3/1918 | Wedge et al. | 23/261 X |
| 1,387,857 | 8/1921 | McKee | 12/260 X |
| 2,166,072 | 7/1939 | Pope et al. | 23/261 X |
| 2,173,877 | 9/1939 | Clark et al. | 23/261 X |
| 2,186,453 | 1/1940 | Gleason et al. | 23/260 X |
| 2,233,841 | 3/1941 | Lepsoe | 23/2 R X |
| 2,295,587 | 9/1942 | Fleming et al. | 23/261 X |
| 2,815,322 | 12/1957 | Higgins | 210/33 |
| 2,858,192 | 10/1958 | Haglund | 23/261 X |
| 2,862,789 | 12/1958 | Burgess | 23/178 R X |
| 3,466,138 | 9/1969 | Spiegler et al. | 23/2 R |

OTHER PUBLICATIONS

Cole et al.; " Absorbing Sulfur Dioxide on Dry Ion Exchange Resins" ; Industrial and Engineering Chemistry; Vol. 52, No. 10, Oct. 1960, pp. 859– 860.

*Primary Examiner*—Morris O. Wolk
*Assistant Examiner*—Barry S. Richman
*Attorney*—Buell, Blenko & Ziesenheim

[57] ABSTRACT

An apparatus for removal of sulfur and nitrogen dioxide from gases which may comprise a plurality of scrubbers and an ion exchange resin bed successively receiving gas containing $SO_2$ and nitrogen oxides and contacting the same with absorbing liquor and the resin bed, means receiving the absorbing liquor from at least one of said scrubbers for removing and concentrating $SO_2$ from at least a portion of said absorbing liquor, and means for concentrating $SO_2$ and nitrogen oxides directly in said resin bed, desorbing means receiving the concentrated $SO_2$ and nitrogen oxides and placing it in gaseous condition and recovery means for gaseous $SO_2$ connected to said desorbing means and receiving gaseous $SO_2$ therefrom, recovering nitrogen oxides in soluble nitrate form.

11 Claims, 3 Drawing Figures

GASEOUS OXIDE RECOVERY

This invention relates to gaseous oxide recovery and particularly to methods and apparatus for removal and recovery of sulfur and nitrogen compounds from gaseous streams such as flue gas and the like. The invention can remove and recover sulfur and nitrogen oxides from flue gas simultaneously.

It has long been recognized that air pollution control is one of the major problems facing this nation particularly in and around urban areas. Even the most agnostic of people now realize that clean air can no longer be taken for granted and that something must be done to protect it, along with other natural resources. The processes of production, consumption and waste disposal which are a part of our way of life have become so expanded in size and numbers that individual communities as well as the nation as a whole can no longer indiscriminately dispose of wastes into the atmosphere without suffering health and economic consequences. There may also be long term effects of air pollution on health, food production and other life processes of which we presently have no knowledge.

Sulfur dioxide is a pollutant of particular concern since it is responsible for almost 20% of the total pollution in the air. It is emitted in large quantities from stationary point sources, mostly power and heat production boilers and coke production facilities and is highly concentrated in these immediate areas. Many state and local governments have come to recognize the specific problem of air pollution raised by sulfur dioxide pollution and have adopted or are working on regulations specifically related to $SO_2$ pollution. As a result of this recognition of the $SO_2$ problem, industries are finding that it is essential that some control be applied to the formation and/or emission of sulfur dioxide as a waste gas. We shall accordingly discuss the removal of sulfur dioxide in detail as exemplifying the invention. Removal of nitrogen dioxide is similar in its operation and will be discussed, but in a more limited degree.

To meet the requirement of reduced sulfur dioxide emission, there appears to be only one reasonable and possible solution; remove the sulfur oxides from the flue gas after combustion and before emission to the atmosphere. Other alternatives which have been suggested are to use low sulfur fuel or fuel from which sulfur has been extracted, use natural gas or use atomic fuel. The first alternative is becoming less and less possible as the supplies of natural low sulfur fuel are depleted and removal of sulfur from the fuel prior to combustion involves special problems for each fuel. The second alternative is limited by the supply of available natural gas and finally the third alternative is limited to very narrow areas of use because of the limited uranium resources and atomic technology. As a result of these limitations, it is apparent that coal and residual oil will be the dominant power fuels for some time and with them will be the sulfur dioxide emission and pollution problem.

Large sums of money have been spent by government and industry for research and development directed toward control of the sulfur dioxide emission problem, however, to the present time, no economical and commercially useful method of controlling sulfur oxide emission in stack gases has been developed. The same can be said for effects to remove sulfur from fuels before combustion. This does not mean that no progress has been made, on the contrary, there are areas of research which show promise of some solution to the sulfur oxide problem. For example, the alkalized alumina, dolomite injection, molten salt and catalytic oxidation processes have been proposed and show some future promise.

Nitrogen oxides, while receiving less general attention than now paid to sulfur oxides, are also important contributors to air pollution. In some cases where the concentrations and flow permit, these pollutants can be easily reduced with conventional absorbers or combustors. In emissions similar to coal or oil burning plants, however, this does not seem to be the answer. The low concentration of nitrogen oxides combined with greater or near equal concentrations of sulfur oxides and/or high flow volumes has to date prevented any successful control and recovery of nitrogen oxides from these emissions.

The present invention provides a new approach to the problem of sulfur and nitrogen oxide removal which includes the recovery of sulfur as sulfur oxides or sulfites, and nitrogen as a soluble nitrate, which in turn may be sold or used to offset the cost of recovery. This is a very definite economic advantage for the present process.

This invention is based upon the principle of absorbing sulfur dioxide in a scrubbing liquor, concentrating the absorbed sulfur dioxide in an ion exchanger as sulfite and/or bisulfite, removing the sulfite and/or bisulfite in a resin regeneration liquor, and heating the regeneration liquor either directly from the ion exchanger or after it has been used as a second scrubber liquor. The bulk of the nitrogen oxides are sorbed in a scavenging resin bed receiving gas from the last scrubber in the series. Sulfur dioxide that escapes the scrubbers is also sorbed in the resin bed. The resin in this bed is mixed with and regenerated with the resin in the ion exchanger.

Preferably this invention provides a pair of scrubbers receiving gas containing sulfur dioxide to be removed and contacting the same with absorbing liquid, an ion exchanger receiving the absorbing liquid from at least one scrubber and removing the sulfur dioxide therefrom by ion exchange, a liquid regeneration system which may be connected to said ion exchanger for removing the sulfur dioxide therefrom, a heated desorbing chamber receiving the regeneration liquid and driving $SO_2$ therefrom by heat and recovery means for gaseous $SO_2$ connected to said desorbing chamber. Preferably the $SO_2$ recovery means is a cooling, drying and compressing apparatus for producing liquid $SO_2$. The system includes a scavenging resin bed receiving gas from the second scrubber to remove nitrogen oxides and $SO_2$ escaping the two scrubbers. In the case of calcium-based regeneration liquors, the system may also be provided with a centrifuge in the regeneration liquor line in place of the ion exchanger to concentrate the compounds containing $SO_2$ in the liquid going to the desorbing chamber. Insoluble compounds are removed from the system either before or after the desorbing chamber depending upon the type of regeneration liquor used. Preferably the ion exchanger is a continuous countercurrent ion exchanger.

In the foregoing general description of the present invention certain objects, purposes and advantages have been set out. Other objects, purposes and advantages of this invention will be apparent from a consideration of the following description and accompanying drawings in which.

Figure 1:
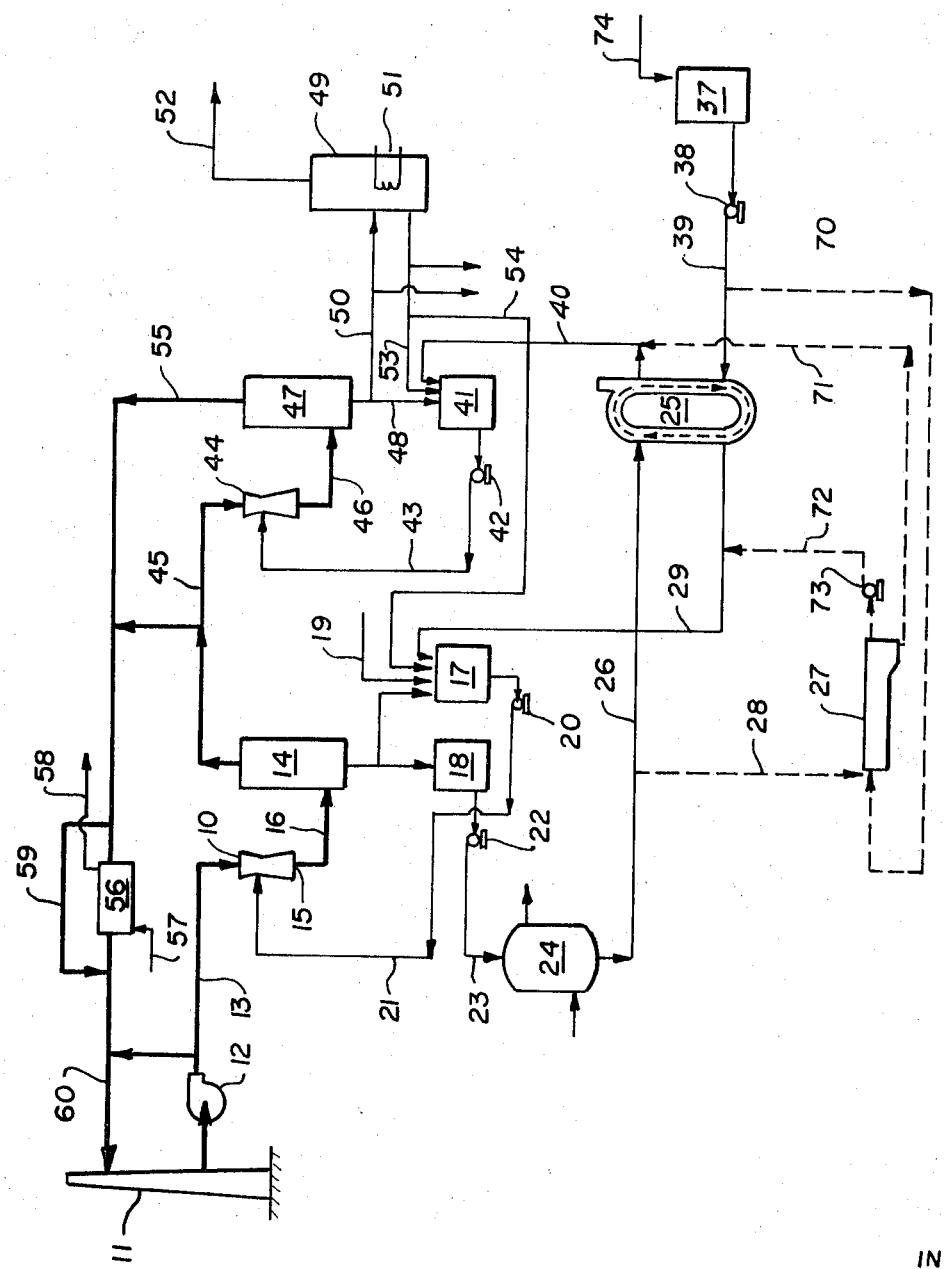
FIG. 1 is a schematic view of the preferred embodiment of plant for sulfur and nitrogen oxides removal from gaseous streams.
Figure 2:
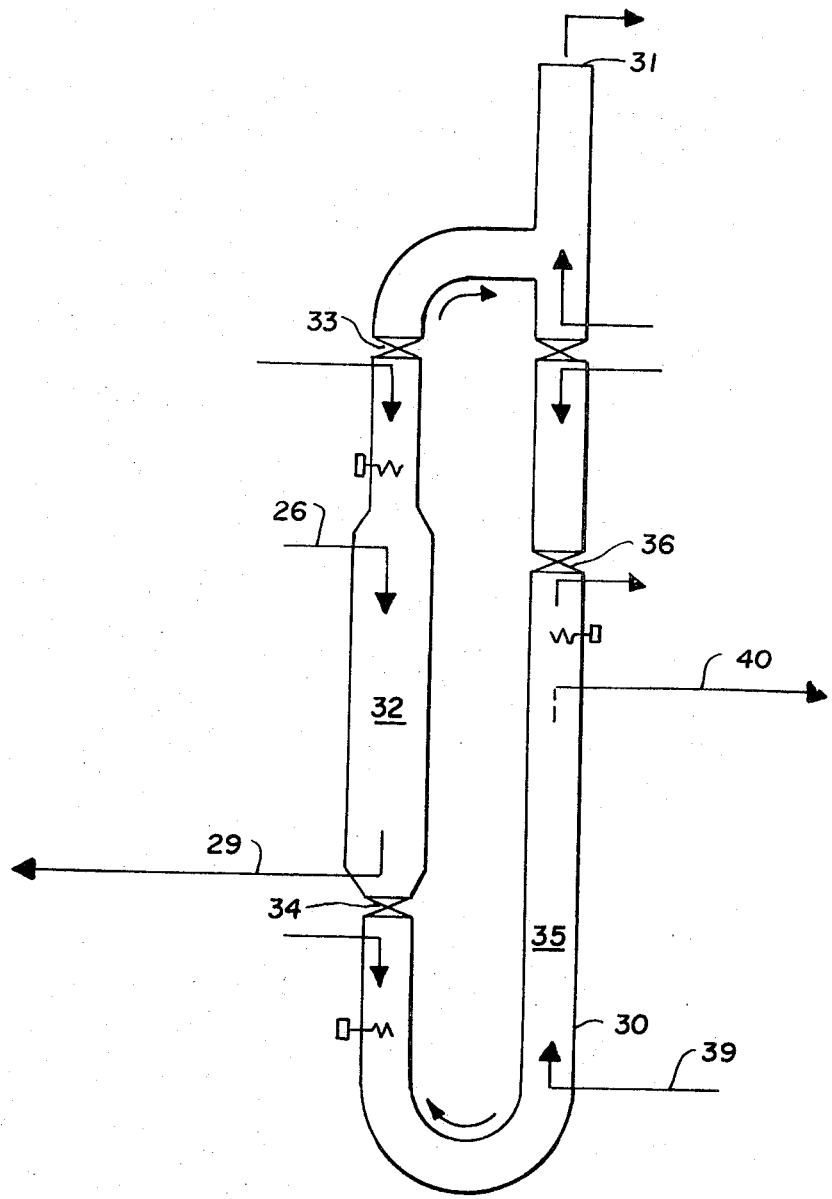
FIG. 2 is an enlarged schematic view of a continuous countercurrent anion exchange unit as used in the plant of FIG. 1.
Figure 3:
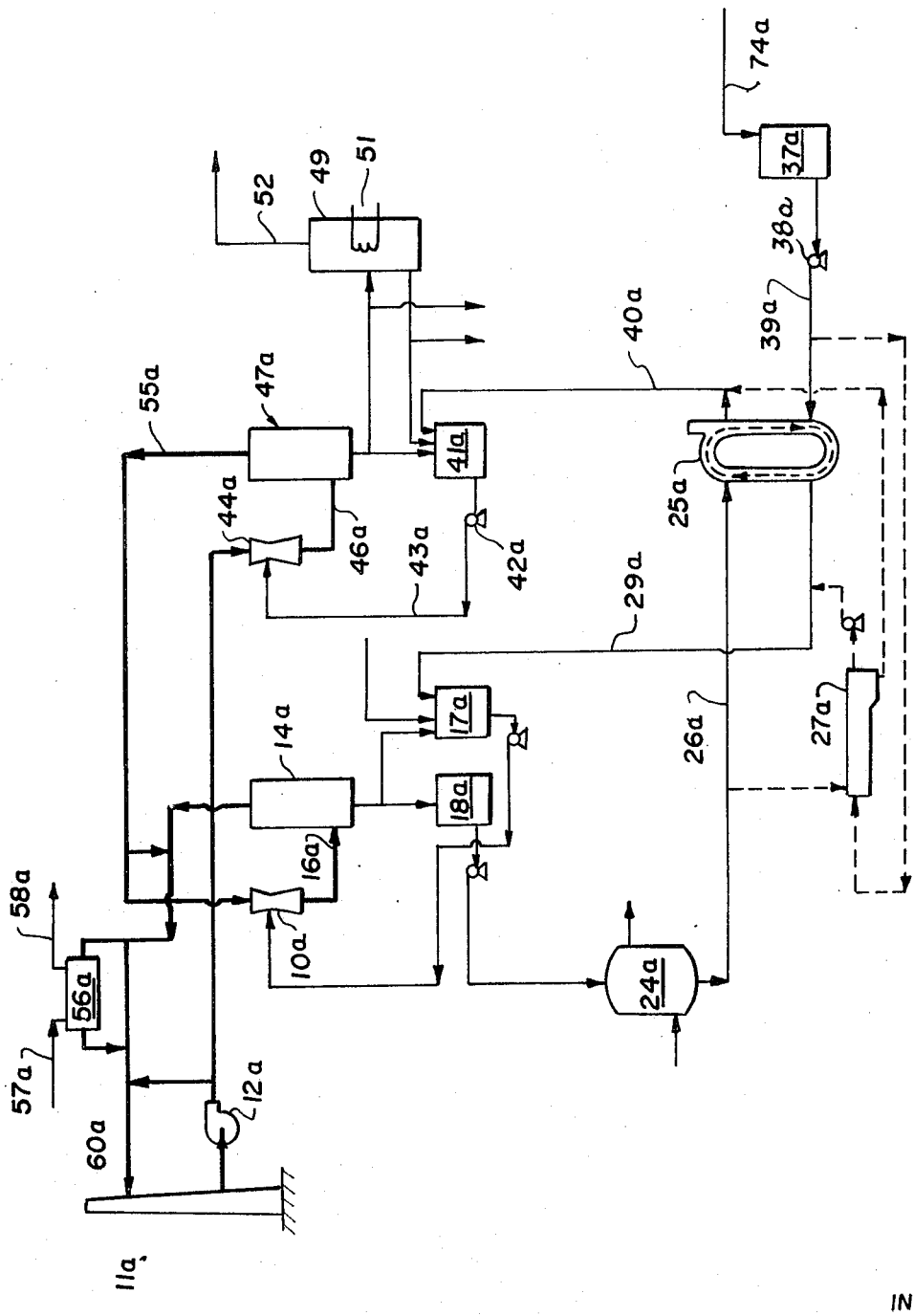
FIG. 3 is a schematic view of a second embodiment of plant for sulfur and nitrogen oxides removal from gaseous streams.

Referring to the drawings there is illustrated in FIGS. 1 and 3 a primary, low pressure-drop venturi 10 receiving flue gas from stack 11 by way of blower 12 and line 13. A packed tower mist eliminator 14 is connected to venturi outlet 15 by line 16 and receives the scrubbing liquor from the venturi for delivery to a scrubbing liquor recirculation tank 17 or to an exchanger feed tank 18 or both. The primary scrubbing liquor going to recirculation tank 17 may be mixed with make-up liquor from make-up input line 19 and is returned to venturi 10 through pump 20 and line 21. The primary scrubbing liquor from feed tank 18 is delivered by pump 22 and line 23 to pressure filter 24 where fly ash and other solids are removed to prevent clogging of the distributors in the ion exchange system 25 which receives the primary scrubbing liquor from filter 24 by means of line 26. Alternatively all or a portion of the primary scrubbing liquor can be by-passed through a centrifuge 27 connected to line 26 by line 28. The primary scrubbing liquor after treatment in ion exchanger 25 is returned to recirculation tank 17 by line 29.

The ion exchange system 25 as illustrated is a continuous countercurrent anion exchanger in the form of an elliptical loop 30 having an overflow 31, an exchange area 32 defined by resin valves 33 and 34 and connected to lines 26 and 29. A regeneration area 35 is defined by valves 34 and 36 into which regeneration liquor is introduced from regeneration liquor storage tank 37 by means of pump 38 and line 39. The effluent from regeneration is carried by line 40 to secondary scrubbing liquor recirculating tank 41. This exchange unit is the subject of U.S. Pat. No. 2,815,322 (1957), entitled COUNTER-CURRENT LIQUID-SOLID MASS TRANSFER METHOD AND APPARATUS, by Irwin R. Higgins.

The secondary scrubbing liquor in tank 41 is delivered by pump 42 and line 43 to a secondary low pressure drop venturi 44 which receives the gas to be treated from mist eliminator 14 by means of line 45. The effluent secondary scrubbing liquor from venturi 44 goes by way of line 46 to a secondary packed tower mist eliminator 47 and from there to either the secondary recirculating liquor tank 41 through line 48 or to a desorber tower 49 by means of line 50. In the desorber tower 49 heat is applied through a heating unit 51 to the secondary scrubbing liquor to remove the $SO_2$ gas which passes from desorber tower 49 to a cooling and compressing unit (not shown) by line 52. The secondary desorbed scrubbing liquor is returned either to the secondary recirculation liquor tank 41 by line 53 or to the primary scrubbing liquor recirculating tank 17 by line 54 or both as desired. Make-up regenerating liquor $C(OH)_x$ is delivered to regenerating liquor storage tank 37 by line 74, where C stands for $Ca^{+2}$, $Mg^{+2}$, $NH_4^+$ or $Na^+$, or similar absorber liquor.

The gas leaving the secondary mist eliminator tower 47 by line 55 is carried to scavenger 56 containing ion exchange resin which is circulated into scavenger 56 by line 57 from an ion regenerator (not shown) and back to the ion regenerator by line 58. A scavenger by-pass line 59 is provided connecting line 55 with line 60 going from scavenger 56 to stack 11.

The operation of the foregoing system is as follows: The flue gas in stack 11 is carried by blower 12 and line 13 into primary venturi 10 where it is contacted by primary scrubbing liquor in the form of a dilute solution of $C(OH)_x$, $C(HSO_3)_x$ and $C(SO_3)_y$. The primary scrubbing liquor which has picked up $SO_2$ is passed through filter 24 to anion resin exchanger 25 where the $SO_2$ is removed onto the resin bed as sulfite and/or bisulfite. When the resin bed is loaded with sulfite and/or bisulfite it is regenerated with an alkaline regeneration liquor such as saturated $C(OH)_x$ solution. The regeneration liquor carrying the $SO_2$ as C sulfite and/or bisulfite is carried to the secondary scrubber venturi 44 where it contacts the scrubbed gas from venturi 10 where it picks up additional $SO_2$. This effluent liquor from venturi 44 then goes to desorber 49 where the sulfur dioxide is evolved in concentrated form by heating the liquor and is carried to a compressor where it is compressed for sale or use.

The $SO_2$ which remains in the gas leaving secondary packed tower mist eliminator 47 is removed by scavenger 56 in a resin bed.

The centrifuge 27 is an alternative method of removing and concentrating $CaSO_3$ which may be used in place of the ion exchanger 25. In this form, $Ca(OH)_2$ from the regenerating liquor storage is delivered by lines 70 to the inlet of the centrifuge and mixed with primary liquor in line 28 to precipitate $CaSO_3$ which is concentrated in the centrifuge. The concentrated $CaSO_3$ slurry is carried by line 71 to secondary recirculating tank 41 to act as the secondary scrubbing liquor. The supernatant liquor from the centrifuge is returned to primary recirculation tank 17 through lines 72 and 29 by pump 73.

In the form illustrated in FIG. 3 the sequence of the two scrubbing systems is reversed. In this arrangement all parts are identical, operate in precisely the same manner and are identified with like numerals bearing the suffix (a). The difference is that the gas to be cleaned is carried first to venturi 44(a) through mist eliminator 17(a), then to venturi 10(a), mist eliminator 14(a) and then to scavenger 56(a). By this arrangement the gas is first scrubbed with the regeneration liquor high in C sulfite and/or C bisulfite in venturi 44(a) and then in water or dilute $C(OH)_x$ in venturi 10(a) before going to scavenger 56(a). The higher $SO_2$ gas concentration will provide a greater driving force for $SO_2$ absorption in the sulfite liquor in venturi 44.

The effectiveness of the process here disclosed is demonstrated in the following example.

EXAMPLE I

A bed of IRA-93 resin was added to a 1-inch column, to a depth of about 8 inches (100 ml. resin). The resin was regenerated, rinsed and drained. A can of $SO_2$ gas was weighed and connected to the bottom of the column and $SO_2$ allowed to slowly pass through the bed. A piece of wet litmus paper was suspended in the column above the bed and the feed of $SO_2$ continued until the paper turned red. This was considered a very sensitive way to determine breakthrough of $SO_2$. As soon as the paper turned red, the $SO_2$ feed was stopped. At this point 12½ grams of $SO_2$ was sorbed on the 100 ml. of IRA-93 resin before breakthrough. On the basis of 32 grams/eq. of $SO_2$, there was 4 eg./l sorbed on the resin or exactly twice the total rated capacity. It would appear from this that the resin was very highly effective for scrubbing $SO_2$ out of the air. The effectiveness of the scavenging bed in recovering $NO_2$ is demonstrated in the following Example II.

EXAMPLE II

A synthetic flue gas, free of $SO_2$, consisting of 0.10–0.20% $NO_2$, 13%–18% $CO_2$, 2%–5% $O_2$ and the balance $N_2$ was passed over a damp IRA-93 resin, the same resin used in Example I. The results of a typical run were as follows:

| Test No. | $NO_2$ Inlet | Outlet | $CO_2$ Inlet | Outlet | $O_2$ Inlet | Outlet |
|---|---|---|---|---|---|---|
| 1 | 0.21 | 0.04 | 18.5 | 19.0 | 5.0 | 6.0 |
| 2 | 0.19 | 0.05 | 13.0 | 13.0 | 4.0 | 4.0 |
| 3 | 0.07 | 0.02 | 14.5 | 14.5 | 5.0 | 5.0 |
| 4 | 0.11 | 0.05 | 15.0 | 14.5 | 2.5 | 2.5 |

The foregoing specification and drawings set out certain presently preferred embodiments and practices of our invention. It will be understood, however, that this invention may be otherwise embodied within the scope of the following claims.

We claim:

1. An apparatus for removal of sulfur dioxide from gases comprising at least one scrubber receiving gas containing sulfur dioxide to be removed, means delivering an absorbing liquor to said scrubber for contacting the gas with said absorbing liquor, an ion exchanger containing an ion exchange material receiving absorbing liquid discharged from said at least one scrubber and removing sulfur dioxide therefrom by ion exchange, a liquid regeneration system connected to said ion exchanger receiving ion exchange material containing sulfur dioxide for removing the sulfur dioxide therefrom and returning the ion exchange material to the ion exchanger, a heated desorbing chamber receiving the regeneration liquid and driving $SO_2$ therefrom by heat and recovery means for gaseous $SO_2$ connected to said desorbing chamber.

2. An apparatus as claimed in claim 1 wherein at least two scrubbers are provided, one delivering absorbing liquid to the ion exchanger and the other to said desorbing chamber, the regeneration liquid is contacted with the gas containing $SO_2$ in said other scrubber not delivering liquid to the ion exchanger, but delivering liquid to said desorbing chamber.

3. An apparatus as claimed in claim 1 wherein the $SO_2$ recovery means includes cooling, drying and compressing means.

4. An apparatus as claimed in claim 1 wherein a scavenging ion exchange resin bed is connected to the last scrubber in line receiving gas therefrom for contact with a resin ion exchange mass, whereby residual $SO_2$ is concentrated directly and simultaneously on the resin.

5. An apparatus as claimed in claim 1 wherein two successive scrubbers are provided, one delivering scrubbing liquid to said ion exchanger and the other receiving regeneration liquor from the ion exchanger for contacting the gas containing $SO_2$.

6. An apparatus for removal of sulfur dioxide from gases comprising a plurality of scrubbers in series successively receiving gas containing sulfur dioxide to be removed, means delivering an absorbing liquor to said scrubbers for contacting the gas with said absorbing liquor, means receiving absorbing liquid discharged from at least one of said scrubbers for removing and concentrating $SO_2$ from at least a portion of said absorbing liquor, means wherein the concentrated liquor is used as scrubbing liquor in at least one of said scrubbers for concentrating $SO_2$ as sulfite, desorbing means receiving the concentrated sulfite and placing it in gaseous condition and recovery means for gaseous $SO_2$ connected to said desorbing means and receiving gaseous $SO_2$ therefrom.

7. An apparatus as claimed in claim 6 wherein the means for removing and concentrating $SO_2$ from the absorbing liquor is a centrifuge.

8. An apparatus as claimed in claim 6 wherein the means for removing and concentrating $SO_2$ from absorbing liquor is an ion exchanger.

9. An apparatus as claimed in claim 6 wherein a scavenging ion exchange resin bed is connected to the last scrubber in line receiving gas therefrom for contact with a resin ion exchange mass, whereby residual $SO_2$ is concentrated directly on the resin.

10. An apparatus for removal of sulfur dioxide from gases comprising a plurality of scrubbers successively receiving gas containing sulfur dioxide to be removed, means for delivering and absorbing liquor to said scrubbers for contacting the gas with said absorbing liquor, an ion exchanger receiving absorbing liquor discharged from at least one scrubber and removing and concentrating sulfur dioxide therefrom by ion exchange, means for delivering an ion exchange regeneration liquid to said ion exchanger, means in the system whereby ion exchange regeneration liquid is contacted with the gas containing $SO_2$ and collecting means collecting the regeneration liquid in spent form to be subsequently used as saleable product to sulfite pulp mills as a source of sulfur.

11. An apparatus for removal of at least one of the group consisting of sulfur dioxide and nitrogen oxides from gases, comprising a single scrubber and a single ion exchange resin scavenger in series with said scrubber successively receiving gas containing at least one of the group consisting of sulfur dioxide and nitrogen oxides to be removed and contacting the same with absorbing liquid, an ion exchanger receiving absorbing liquor discharged from the scrubber and removing and concentrating sulfur dioxide therefrom by ion exchange, the same ion exchanger receiving exchange resin from the scavenger which is loaded with sulfur dioxide and nitrogen oxides, and a liquid regeneration system connected to said ion exchanger for removing at least one of the group consisting of sulfur dioxide and nitrogen oxides from the ion exchange resin whereby the resin is regenerated.

* * * * *

UNITED STATES PATENT OFFICE
CERTIFICATE OF CORRECTION

Patent No. 3,660,040    Dated  May 2, 1972

Inventor(s)  Charles I. Harding et al.

It is certified that error appears in the above-identified patent and that said Letters Patent are hereby corrected as shown below:

On the cover sheet insert -- [73] Assignee:  Reynolds, Smith and Hills, Jacksonville, Fla. --.

Signed and sealed this 7th day of November 1972.

(SEAL)
Attest:

EDWARD M. FLETCHER, JR.　　　　　　　　ROBERT GOTTSCHALK
Attesting Officer　　　　　　　　　　　　Commissioner of Patents